United States Patent
Hao et al.

(10) Patent No.: US 8,391,229 B2
(45) Date of Patent: Mar. 5, 2013

(54) METHOD AND APPARATUS FOR SEQUENCING ZC SEQUENCES OF A RANDOM ACCESS CHANNEL

(75) Inventors: Peng Hao, Shenzhen (CN); Shuqiang Xia, Shenzhen (CN); Bo Dai, Shenzhen (CN); Chunli Liang, Shenzhen (CN); Bin Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 271 days.

(21) Appl. No.: 12/864,653

(22) PCT Filed: Dec. 2, 2008

(86) PCT No.: PCT/CN2008/073299
§ 371 (c)(1),
(2), (4) Date: Jul. 26, 2010

(87) PCT Pub. No.: WO2009/097727
PCT Pub. Date: Aug. 13, 2009

(65) Prior Publication Data
US 2010/0309993 A1 Dec. 9, 2010

(30) Foreign Application Priority Data
Jan. 30, 2008 (CN) .......................... 2008 1 0008443

(51) Int. Cl.
*H04W 4/00* (2009.01)

(52) U.S. Cl. ........ 370/329; 370/334; 370/342; 455/101; 455/296

(58) Field of Classification Search .................. 370/334, 370/342; 375/267, 295, 299, 316; 455/101, 455/132, 296, 500
See application file for complete search history.

(56) References Cited

U.S. PATENT DOCUMENTS

2008/0235314 A1* 9/2008 Lee et al. ....................... 708/426
2012/0076098 A1* 3/2012 Han et al. ....................... 370/329

* cited by examiner

*Primary Examiner* — Kibrom T Hailu
*Assistant Examiner* — Zewdu A Beyen
(74) *Attorney, Agent, or Firm* — Li & Cai Intellectual Property (USA) Office

(57) ABSTRACT

The present invention provides a method and apparatus for sequencing ZC sequences of a random access channel. The method comprises: setting $\alpha$ as a logical index of each ZC sequence, and u as a physical index of said each ZC sequence, wherein $1 \leq u \leq N-1$, $0 \leq \alpha \leq N-2$, and N is the length of said each ZC sequence; establishing a mapping relationship between the logical index and the physical index: u=N/2 is taken as a symmetry axis, $\alpha$ is mapped to u in a manner of longitudinal symmetry, and on the upper side of the symmetry axis, u monotonously decreases or increases, while on the lower side of the symmetry axis, u monotonously increases or decreases. This method ensures that the PRACHs of the UEs using different sequences in a same cell have similar coverage, thus the flexibility of cell planning is increased.

10 Claims, 3 Drawing Sheets

METHOD AND APPARATUS FOR SEQUENCING ZC SEQUENCES OF A RANDOM ACCESS CHANNEL

CROSS REFERENCE TO RELATED APPLICATION

This application is national phase of International Application No. PCT/CN2008/073299, entitled "A METHOD AND APPARATUS FOR SEQUENCING ZC SEQUENCES OF A RANDOM ACCESS CHANNEL", which was filed on Dec. 2, 2008 and claims priority of Chinese patent Application No. 200810008443.X filed on 30 Jan., 2008, which is hereby incorporated by reference herein.

TECHNICAL FIELD

The present invention relates to communication field, more specifically relates to a method and apparatus for sequencing ZC sequences of a random access channel.

BACKGROUND OF THE INVENTION

In the Long Term Evolution (LTE for short) system, cyclic shift sequences of Zadoff-Chu (ZC for short) sequences are used as the preamble by the Random Access Channel (RACH for short). These cyclic shift sequences are also referred to as Zero Correlation Zone (ZCZ for short) sequences.

In practical systems, after a mobile phone is powered on, downlink synchronization is first performed, and then the detection of the Broadcast Channel (BCH for short) is initiated. A base station informs, via the BCH channel, the mobile phone of a logical index (Logical index) and the step length of the cyclic shift of the first ZC sequence available for the RACH of the current cell. According to the logical index, the mobile phone makes use of certain mapping rule to calculate a physical index (Physical index) of the corresponding ZC sequence, and then, generates usable ZCZ sequences according to the step length of the cyclic shift (and a certain "cyclic shift limitation rule" in case of high speed circumstances). If the number of the ZCZ sequences is smaller than a preset threshold P, the mobile phone automatically increments the sequence index, and continuously generates the ZCZ sequences using the next ZC sequence, until the total number of the ZCZ sequences is larger than or equal to P. Finally, the mobile phone randomly selects one sequence from all the generated usable ZCZ sequences as a preamble to be sent.

In practice, the mapping process between the logical indices and the physical indices of the ZC sequences is the process of re-sequencing the ZC sequences Wherein the generation formula of the ZC sequences is shown by Equation (1), wherein N is the length of the sequence, u is the physical index of the sequence, which refers to an index used in the generation of each ZC sequence, and $g_n(n)$ represents the sequence value of the $n^{th}$ sample point whose physical index is u. The index of the sequence is the sequence number of each ZC sequence in a queue of sequenced ZC sequences, where the ZC sequences are sequenced according to a certain criterion.

$$g_u(n) = \begin{cases} e^{-j\frac{2\pi}{N}\frac{1}{2}un^2} & \text{when } N \text{ is even} \\ e^{-j\frac{2\pi}{N}\frac{1}{2}un(n+1)} & \text{when } N \text{ is odd} \end{cases}, n = 0, 1, \ldots, N-1 \quad (1)$$

FIG. 1 is a schematic diagram showing the frame structure of the Time Division Duplex (TDD) mode in the LTE system. As shown in FIG. 1, in this kind of frame structure, a radio frame of 10 ms (307200 Ts, 1 ms=30720 Ts) is divided into two half-frames, each half-frame is divided into 10 time slots of 0.5 ms, every two time slots compose a subframe of 1 ms, one radio frame comprises 10 subframes (which are numbered from 0 to 9), and one radio frame comprises 20 time slots (which are numbered from 0 to 19). For normal Cyclic Prefixes (CP) with lengths of 5.21 us and 4.69 us, one time slot comprises 7 uplink/downlink symbols of 66.7 us, wherein the length of the Cyclic Prefix of the first symbol is 5.2 us and that of the Cyclic Prefixes of the other 6 symbols is 4.69 us. For extended Cyclic Prefixes with a length of 16.67 us, one time slot comprises 6 uplink/downlink symbols. Additionally, in this kind of frame structure, the configuration of subframes has the following characteristics:

subframes 0 and 5 are fixed to be used in downlink transmission;
uplink/downlink switch with cycles of 5 ms and 10 ms is supported;
subframes 1 and 6 are special subframes which are used to transmit 3 special time slots, i.e. Downlink Pilot Time Slot (DwPTS), Guard Period (GP) and Uplink Pilot Time Slot (UpPTS), wherein
the DwPTS is used for downlink transmission;
the GP is Guard Period and does not transmit any data;
the UpPTS is used for uplink transmission, comprising at least 2 uplink Single Carrier-Frequency Division Multiple Access (SC-FDMA) symbols for transmitting the Physical Random Access Channel (PRACH). For 5 ms uplink/downlink switch cycle, the UpPTS and subframes 2 and 7 are always used for uplink transmission; while for 10 ms switch cycle, the length of the UpPTS in subframe 6 is 0 and that of the UpPTS in subframe 1 can either be 0 or larger than 0.

In the process of switching between uplink and downlink with a cycle of 5 ms, subframes 2 and 6 are fixed to be used for uplink transmission;

In the process of switching between uplink and downlink with a cycle of 10 ms, the DwPTS exists in two half-frames, the GP and the UpPTS exist in the first half-frame, the period of the DwPTS in the second half-frame is 1 ms, subframe 2 is used for uplink transmission and subframes 7 to 9 are used for downlink transmission. There are two types of PRACH in the TDD mode of the LTE system, wherein the first type is transmitted in non-special uplink subframes (subframes comprising special time slots are called as special subframe); and the second type is transmitted in the UpPTS. In the method for sequencing the first type of PRACH, all sequences are divided into two groups according to the Cubic Metrics (CMs) with a threshold of 1.2 dB, then in each group, sequences are divided into several sub-groups according to the maximum cyclic shift supported by the sequences in a cyclic shift limiting condition, and at last in each sub-group sequencing is conducted according to Cubic Metric values of the sequences. Cubic Metric (CM) is a kind of standard for measuring peak-to-average ratio of transmitting data, wherein the larger the CM is, the higher the peak-to-average ratio is. Its calculating method is as shown in the following formula (2):

$$CM = \frac{20\log_{10}\{\text{rms}[v_{norm}^3(t)]\} - 1.52}{1.56} \text{dB} \quad (2)$$

wherein $$v_{norm}(t) = \frac{|v(t)|}{\text{rms}[v(t)]}, \quad \text{rms}(x) = \sqrt{\frac{(x'x)}{M}},$$

v(t) is the amplitude of time domain signal, a cluster of discrete time domain sample points v(m) are obtained to simulate v(t) by performing sampling to time domain signal $g_u(n)$ of n=0, 1, ..., N−1 at the time point of m=0, 1, ..., M−1, M is the dimensionality of vectorX, and M>N.

It is obvious that the larger the dimensionality M of vectorx is, i.e. the more the sampling points are, the smoother the curve is, wherein the curve is obtained by imitating v(t) using discrete time domain sample points v(m), the higher the precision of the imitation is, and thus the higher the precision of the obtained CM values is.

Compared with the first type of PRACH, the second type of PRACH has broader sub-carriers, is more resistant against Doppler frequency offset and can solve the problem of frequency offset without using cyclic shift limit. Therefore, the method for sequencing the first type of PRACH is not applicable to the second type of PRACH. However, since the method for sequencing the ZC sequences applicable to the second type of PRACH has not been provided in the existing technologies, sequences with similar CM values can not be allocated to the same cell, with a result that different UEs using different ZC sequences in the same cell have different coverage, which restricts the flexibility of cell planning.

SUMMARY OF THE INVENTION

Aiming at the problem that the sequencing for the ZC sequences has not been provided, thus different UEs using different ZC sequences in the same cell have different coverage, the present invention provides an improved method for sequencing ZC sequences to solve the above problem.

According to one aspect of the present invention, a method for sequencing ZC sequences of a random access channel is provided, the method comprises the following steps: setting α as a logical index of each ZC sequence, and u as a physical index of said each ZC sequence, wherein 1≦u≦N−1, 0≦α≦N−2, and N is the length of said each ZC sequence; establishing a mapping relationship between the logical index and the physical index: u=N/2 is taken as a symmetry axis, α is mapped to u in a manner of longitudinal symmetry, and on the upper side of the symmetry axis, u monotonously decreases or increases, while on the lower side of the symmetry axis, u monotonously increases or decreases.

Preferably, that u monotonously decreases on the upper side of the symmetry axis and monotonously increases on the lower side of the symmetry axis specifically comprises: using a function $$u = \left( (-1)^\alpha \left\lfloor \frac{\alpha}{2} + 1 \right\rfloor \right) \bmod N$$

to establish the mapping relationship between the logical index and the physical index.

Preferably, N=139, and for α=0, 1, 2, ..., 137, the mapped u is 1 138 2 137 136 4 135 5 ... 69 70.

Preferably, that u monotonously increases on the upper side of the symmetry axis and monotonously decreases on the lower side of the symmetry axis specifically comprises: using a function $$u = \left( (-1)^\alpha \left\lfloor \frac{N-\alpha}{2} \right\rfloor \right) \bmod N$$

to establish the mapping relationship between the logical index and the physical index.

Preferably, N=139, and for α=0, 1, 2, ..., 137, the mapped u is 69 70 68 71 72 66 73 ... 1 138.

According to another aspect of the present invention, an apparatus for sequencing ZC sequences of a random access channel is provided, the apparatus comprises a setting module, configured to set α as a logical index of each ZC sequence, and u as a physical index of said each ZC sequence, wherein 1≦u≦N−1, 0≦α≦N−2, and N is the length of said each ZC sequence; and an establishing module, configured to establish a mapping relationship between the logical index and the physical index: wherein u=N/2 is taken as a symmetry axis, α is mapped to u in a manner of longitudinal symmetry, and on the upper side of the symmetry axis, u monotonously decreases or increases, while on the lower side of the symmetry axis, u monotonously increases or decreases.

Preferably, the establishing module establishes the mapping relationship between the logical index and the physical index using a function $$u = \left( (-1)^\alpha \left\lfloor \frac{\alpha}{2} + 1 \right\rfloor \right) \bmod N.$$

Preferably, N=139, and for α=0, 1, 2, ..., 137, the mapped u is 1 138 2 137 136 4 135 5 ... 69 70.

Preferably, the establishing module establishes the mapping relationship between the logical index and the physical index using a function $$u = \left( (-1)^\alpha \left\lfloor \frac{N-\alpha}{2} \right\rfloor \right) \bmod N.$$

Preferably, N=139, and for α=0, 1, 2, ..., 137, the mapped u is 69 70 68 71 72 66 73 ... 1 138.

When the physical index of a sequence is smaller than or equal to ⌊N/2⌋, the CM value of the sequence approximately increases with the increase of the physical index of the sequence, while when the physical index of a sequence is larger than or equal to ⌊N/2⌋, the CM value of the sequence approximately decreases with the increase of the physical index of the sequence. Thus, the method and apparatus for sequencing ZC sequences provided by the present invention is equivalent to performing proper sequencing to the ZC sequences according to CM values, so, that a network planner can allocate ZC sequences with similar CM values to the same cell, which ensures that the PRACHs of the UEs using different sequences in the same cell have similar coverage, the problem that the sequencing for the ZC sequences has not been provided, thus different UEs using different ZC sequences in the same cell have different coverage can be solved, thus the flexibility of cell planning is increased.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE PREFERRED EMBODIMENTS

Summary of the Function

Based on the fact that when the physical index of a sequence is smaller than or equal to $\lfloor N/2 \rfloor$, the CM value of the sequence approximately increases with the increase of the physical index of the sequence, while when the physical index of a sequence is larger than or equal to $\lfloor N/2 \rfloor$, the CM value of the sequence is approximately decreases with the increase of the physical index of the sequence, in the technical solution provided by the embodiment of the present invention, proper sequencing to the ZC sequences is performed according to CM values, and ZC sequences with similar CM values are allocated to the same cell, which ensures that the PRACHs of the UEs using different sequences in the same cell have similar coverage, thus the flexibility of cell planning is increased.

The embodiments of the present invention will be illustrated in combination with the accompanying drawings in details as follows. What needs to be explained is that the embodiments of the present invention and the features of the embodiments can be combined with each other if there is no conflict.

The embodiment of the present invention will be illustrated in detail using TDD mode of LTE as an example.

Figure 1:
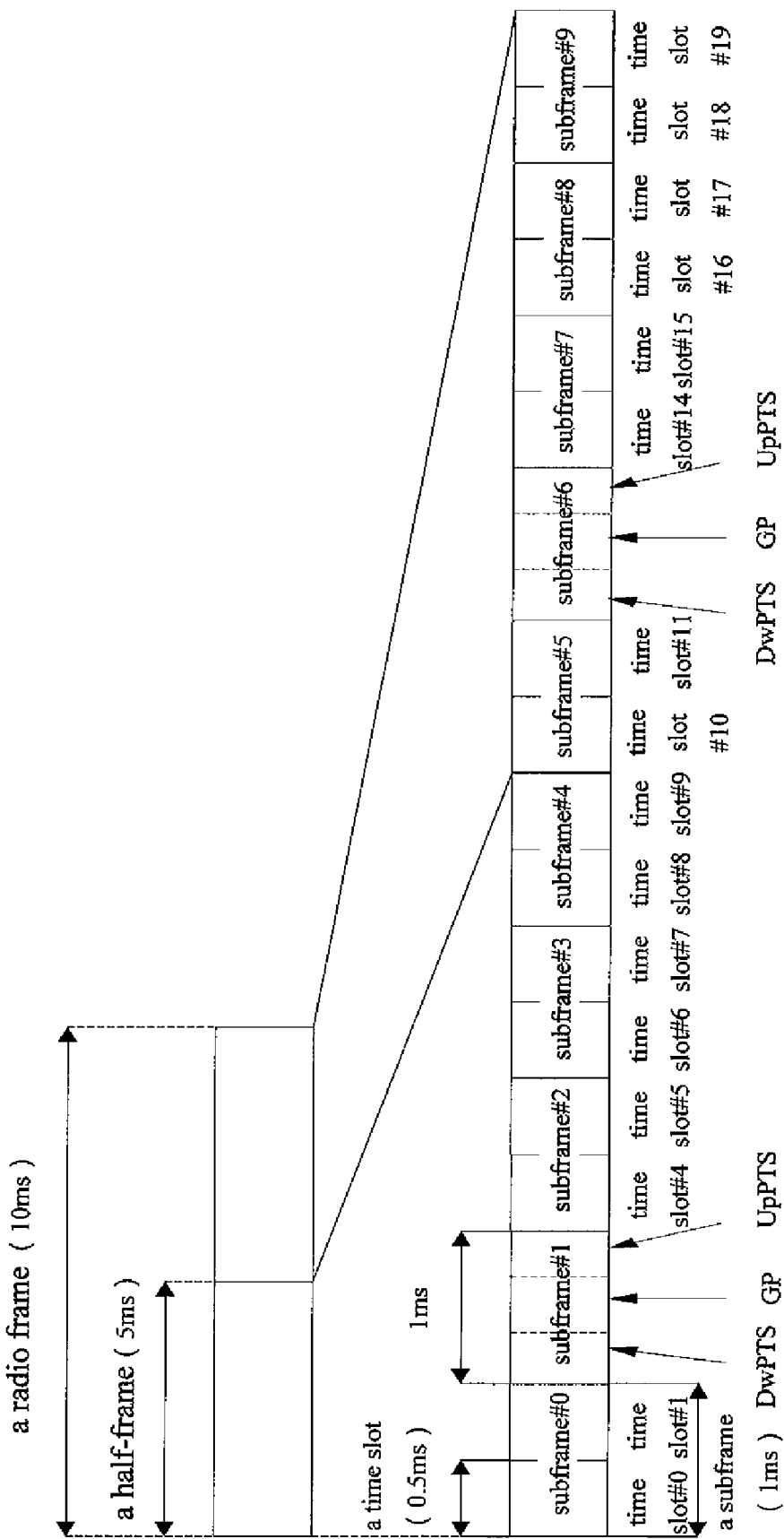
FIG. 1 is a schematic diagram showing the frame structure of TDD mode in LTE system in relevant technologies.
Figure 2:
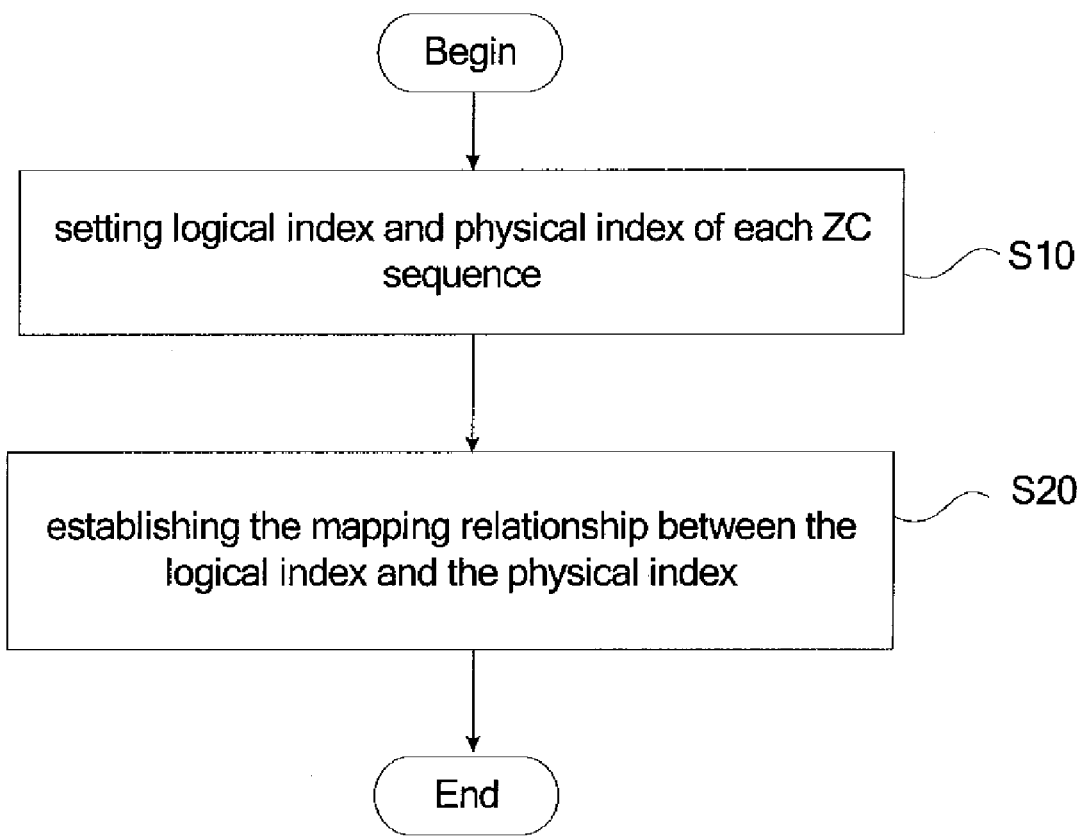
FIG. 2 is a flow chart showing the method for sequencing ZC sequences according to an embodiment of the present invention.

FIG. 2 is a flow chart showing the method for sequencing ZC sequences according to an embodiment of the present invention. As shown in FIG. 2, the method comprises the following steps:

Step 10, $\alpha$ is set as the logical index of each ZC sequence, and u as the physical index of each ZC sequence, wherein $1 \leq u \leq N-1$, $0 \leq \alpha \leq N-2$, and N is the length of each ZC sequence;

Step 20, a mapping relationship between the logical index and the physical index is established as follows: u=N/2 is taken as a symmetry axis, $\alpha$ is mapped to u in a manner of longitudinal symmetry, and on the upper side of the symmetry axis, u monotonously decreases or increases, while on the lower side of the symmetry axis, u monotonously increases or decreases Obviously, here $\alpha$ is taken as a horizontal axis, while u as a vertical axis. That u is located on the upper side of the symmetry axis represents u is larger than or equal to $\lfloor N/2 \rfloor$, while that u is located on the lower side of the symmetry axis represents u is smaller than or equal to $\lfloor N/2 \rfloor$.

Figure 3:
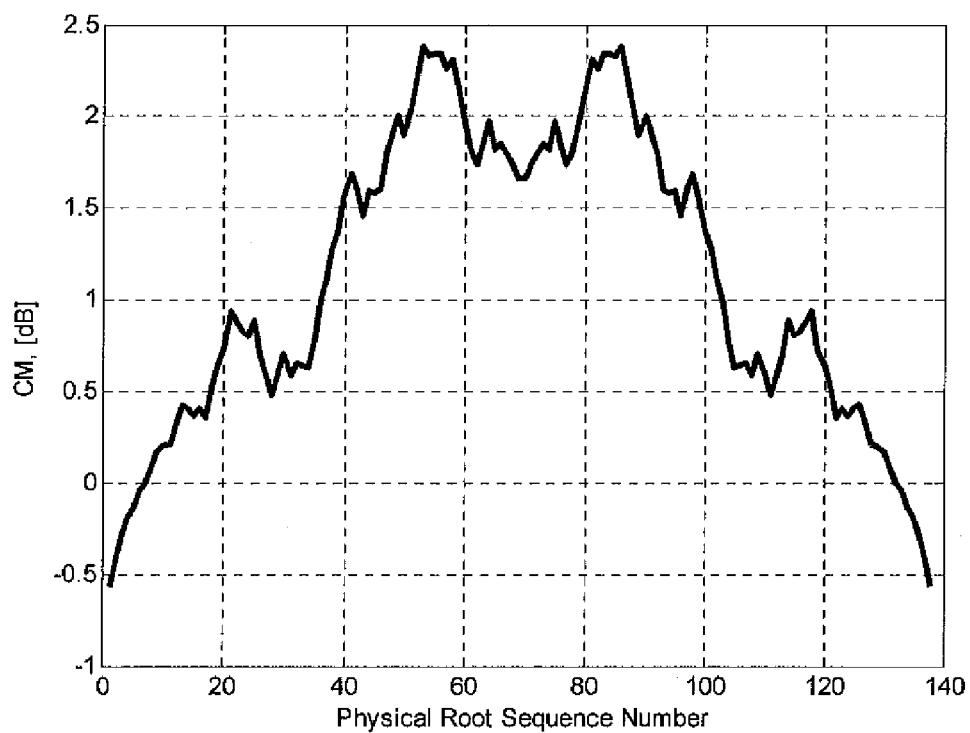
FIG. 3 shows the relationship between the root sequence physical indices and the CM values before sequencing (N is 139)

FIG. 3 shows the relationship between the root sequence physical indices and the CM values before sequencing (N is 139). As shown in FIG. 3, when the physical index of a sequence is smaller than or equal to $\lfloor N/2 \rfloor$, the CM value of the sequence approximately increases with the increase of the physical index of the sequence, while when the physical index of a sequence is larger than or equal to $\lfloor N/2 \rfloor$, the CM value of the sequence approximately decreases with the increase of the physical index of the sequence.

Therefore, the sequencing method in the embodiment uses the character shown in FIG. 3, proper sequencing of ZC sequences is performed according to the CM values so that ZC sequences with similar CM values are allocated to the same cell, which ensures that the PRACHs of the UEs using different sequences in the same cell have similar coverage, thus the flexibility of cell planning is increased.

EMBODIMENT 1

In the conditions that on the upper side of the symmetry axis, u monotonously decreases, and that on the lower side of the symmetry axis, u monotonously increased, a function $$u = \left( (-1)^\alpha \left\lfloor \frac{\alpha}{2} + 1 \right\rfloor \right) \bmod N$$

is used to establish the mapping relationship between the logical index and the physical index, and this formula is equivalent to the following formula $$u = \begin{cases} \frac{\alpha}{2} + 1, & \text{when } \alpha \text{ is even} \\ N - \frac{\alpha+1}{2}, & \text{when } \alpha \text{ is odd} \end{cases}$$

The length N of the ZC sequences used by the random access channel is 139, and the number of usable sequences is 138. For $\alpha$=0, 1, 2, ..., 137, the mapped u is 1 138 2 137 3 136 4 135 5 ... 69 70.

EMBODIMENT 2

In the conditions that on the upper side of the symmetry axis, u monotonously increases, and that on the lower side of the symmetry axis, u monotonously decreases, a function $$u = \left( (-1)^\alpha \left\lfloor \frac{N-\alpha}{2} \right\rfloor \right) \bmod N$$

is used to establish the mapping relationship between the logical index and the physical index, and this formula is equivalent to the following formula $$u = \begin{cases} \left\lfloor \frac{N}{2} \right\rfloor - \frac{\alpha}{2}, & \text{when } \alpha \text{ is even} \\ \left\lfloor \frac{N}{2} \right\rfloor + \frac{\alpha+1}{2}, & \text{when } \alpha \text{ is odd} \end{cases}$$

The length N of the ZC sequences used by the random access channel is 139, and the number of usable sequences is 138. For $\alpha$=0, 1, 2, ..., 137, the mapped u is 69 68 71 67 72 66 73 ... 1 138.

Figure 4:
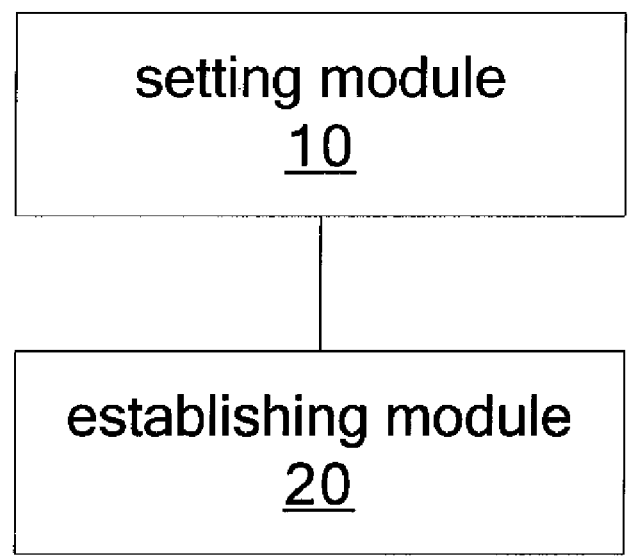
FIG. 4 is a block diagram showing the apparatus for sequencing ZC sequences according to an embodiment of the present invention.

FIG. 4 is a block diagram showing the apparatus for sequencing ZC sequences according to an embodiment of the present invention. As shown in FIG. 4, the apparatus comprises a setting module 10 and an establishing module 20. The two modules will be illustrated in details as follows.

a setting module 10 is configured to set a as the logical index of each ZC sequence, and u as the physical index of each ZC sequence, wherein $1 \leq u \leq N-1, 0 \leq \alpha \leq N-2$, and N is the length of each ZC sequence;

an establishing module 20, connected to the setting module 10, configured to establish the mapping relationship between the logical index and the physical index set by the setting module 10: wherein u=N/2 is taken as symmetry axis, $\alpha$ is mapped to u in a manner of longitudinal symmetry, and on the upper side of the symmetry axis, u monotonously decreases or increases, while on the lower side of the symmetry axis, u monotonously increases or decreases.

Preferably, the establishing module 20 establishes the mapping relationship between the logical index and the physical index using a function $$u = ((-1)^\alpha \lfloor \tfrac{\alpha}{2} + 1 \rfloor) \bmod N.$$

N=139, and for α=0, 1, 2, . . . , 137, the mapped u is 1 138 2 137 3 136 4 135 5 . . . 69 70.

Preferably, the establishing module 20 establishes the mapping relationship between the logical index and the physical index using a function $$u = ((-1)^\alpha \lfloor \tfrac{N-\alpha}{2} \rfloor) \bmod N.$$

N=139, and for α=0, 1, 2, . . . , 137, the mapped u is 69 70 68 71 67 72 66 73 . . . 1 138.

The calculation using the above formulae is simple and these formulae properly represent the mapping relationship of the embodiment shown in FIG. 2. Due to the calculation using formulae, mapping tables do not need to be stored in base stations and mobile phones, which saves storage space and reduces design costs. The reason for establishing formulae with such simple calculation to establish the mapping relationship is because that in the embodiments of the present invention, it is found out that when the physical index of a sequence is smaller than or equal to ⌊N/2⌋, the CM value of the sequence approximately increases with the increase of the physical index of the sequence, while when the physical index of a sequence is larger than or equal to ⌊N/2⌋, the CM value of the sequence approximately decreases with the increase of the physical index of the sequence, a simple mapping relationship is thereby be established, i.e. u=N/2 is taken as the symmetry axis, α is mapped to u in a manner of longitudinal symmetry, and on the upper side of the symmetry axis, u monotonously decreases or increases, while on the lower side of the symmetry axis, u monotonously increases or decreases.

It can be seen from the above descriptions that when the physical index of a sequence is smaller than or equal to ⌊N/2⌋, the CM value of the sequence approximately increases with the increase of the physical index of the sequence, while when the physical index of a sequence is larger than or equal to ⌊N/2⌋, the CM value of the sequence approximately decreases with the increase of the physical index of the sequence. The apparatus for sequencing ZC sequences provided by the embodiment of the present invention proper sequencing for ZC sequences is performed according to the CM values so that ZC sequences with similar CM values are allocated to the same cell, which ensures that the PRACHs of the UEs using different sequences in the same cell have similar coverage, thus the flexibility of cell planning is increased.

To sum up, in the technical solutions provided by the embodiments of the present invention, the sequencing results obtained by the sequencing method and apparatus enable the operators to plan and allocate sequences according to the CM characteristics of the sequences, so as to allocate sequences with similar CM values to the same cell, which ensures that the PRACHs of the UEs using different sequences in the same cell have similar coverage. In addition, as sequences u and N-u have completely the same CM values, sequences u and N-u are allocated to the same cell by using the sequencing results obtained by the method and apparatus provided by the embodiments of the present invention. As sequences u and N-u are symmetrical to each other in sequence structure, the complexity for detection of a base station receiver can be reduced.

It should be understood by those skilled in the art that each module and step in the present invention may be carried out by universal computing devices either by being integrated in a single computing device or distributed in a network composed of a plurality of computing devices. Alternatively, they can be carried out by program codes performable for the computing device, thus they may be stored in a storing device for implementation by the computing device or respectively produced into individual integrate circuit modules, additionally, a plurality of them may also be integrated into a single integrate circuit module. Therefore, the present invention is not restricted to any specific combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

The invention claimed is:

1. A method for sequencing Zadoff-Chu sequences of a random access channel, characterized by, comprising:
setting α as a logical index of each Zadoff-Chu sequence, and u as a physical index of said each Zadoff-Chu sequence, wherein 1≦u≦N−1, 0≦α≦N−2, and N is the length of said each Zadoff-Chu sequence; and
establishing a mapping relationship between the logical index and the physical index: u=N/2 is taken as a symmetry axis, α is mapped to u in a manner of longitudinal symmetry, and on the upper side of the symmetry axis, u monotonously decreases or increases, while on the lower side of the symmetry axis, u monotonously increases or decreases.

2. The method for sequencing Zadoff-Chu sequences according to claim 1, characterized in that if u monotonously decreases on the upper side of the symmetry axis and monotonously increases on the lower side of the symmetry axis, establishing a mapping relationship between the logical index and the physical index specifically comprises:
using a function $$u = ((-1)^\alpha \lfloor \tfrac{\alpha}{2} + 1 \rfloor) \bmod N$$

to establish the mapping relationship between the logical index and the physical index.

3. The method for sequencing Zadoff-Chu sequences according to claim 2, characterized in that N=139, and for α=0, 1, 2, . . . , 137, the mapped u is 1 138 2 137 3 136 4 135 5 . . . 69 70.

4. The method for sequencing Zadoff-Chu sequences according to claim 1, characterized in that if u monotonously increases on the upper side of the symmetry axis and monotonously decreases on the lower side of the symmetry axis, establishing a mapping relationship between the logical index and the physical index specifically comprises: using a function $$u = \left((-1)^\alpha \left\lfloor \frac{N-\alpha}{2} \right\rfloor\right) \bmod N$$

to establish the mapping relationship between the logical index and the physical index.

5. The method for sequencing Zadoff-Chu sequences according to claim 4, characterized in that N=139, and for α=0, 1, 2, ..., 137, the mapped u is 69 70 68 71 67 72 66 73 ... 1 138.

6. An apparatus for sequencing Zadoff-Chu sequences of a random access channel, characterized by, comprising:

a setting module, configured to set α as a logical index of each Zadoff-Chu sequence, and u as a physical index of said each Zadoff-Chu sequence, wherein 1≦u≦N−1, 0≦α≦N−2, and N is the length of said each Zadoff-Chu sequence;

an establishing module, configured to establish a mapping relationship between the logical index and the physical index: u=N/2 is taken as a symmetry axis, α is mapped to u in a manner of longitudinal symmetry, and on the upper side of the symmetry axis, u monotonously decreases or increases, while on the lower side of the symmetry axis, u monotonously increases or decreases; and a computing device comprising a processor coupled to a memory, the processor is configured to execute the setting module and the establishing module.

7. The apparatus for sequencing Zadoff-Chu sequences according to claim 6, characterized in that the establishing module establishes the mapping relationship between the logical index and the physical index using a function $$u = \left((-1)^\alpha \left\lfloor \frac{\alpha}{2} + 1 \right\rfloor\right) \bmod N.$$

8. The apparatus for sequencing Zadoff-Chu sequences according to claim 7, characterized in that N=139, and for α=0, 1, 2, ..., 137, the mapped u is 1 138 2 137 3 136 4 135 5 ... 69 70.

9. The apparatus for sequencing Zadoff-Chu according to claim 6, characterized in that the establishing module establishes the mapping relationship between the logical index and the physical index using a function $$u = \left((-1)^\alpha \left\lfloor \frac{N-\alpha}{2} \right\rfloor\right) \bmod N.$$

10. The apparatus for sequencing Zadoff-Chu according to claim 9, characterized in that N=139, and for α=0, 1, 2, ..., 137, the mapped u is 69 70 68 71 67 72 66 73 ... 1 138.

\* \* \* \* \*